(12) United States Patent
Dai et al.

(10) Patent No.: US 12,106,546 B2
(45) Date of Patent: Oct. 1, 2024

(54) IMAGE CLASSIFICATION METHOD FOR MAXIMIZING MUTUAL INFORMATION, DEVICE, MEDIUM AND SYSTEM

(71) Applicant: SHANGHAI JIAO TONG UNIVERSITY, Shanghai (CN)

(72) Inventors: Wenrui Dai, Shanghai (CN); Yaoming Wang, Shanghai (CN); Yuchen Liu, Shanghai (CN); Chenglin Li, Shanghai (CN); Junni Zou, Shanghai (CN); Hongkai Xiong, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/623,054

(22) Filed: Apr. 1, 2024

(65) Prior Publication Data

US 2024/0242480 A1 Jul. 18, 2024

Related U.S. Application Data

(63) Continuation of application No. PCT/CN2022/116045, filed on Aug. 31, 2022.

(30) Foreign Application Priority Data

Oct. 8, 2021 (CN) .......................... 202111170350.9

(51) Int. Cl.
*G06V 10/00* (2022.01)
*G06V 10/764* (2022.01)
(Continued)

(52) U.S. Cl.
CPC .......... *G06V 10/765* (2022.01); *G06V 10/776* (2022.01); *G06V 10/82* (2022.01); *G06V 20/70* (2022.01)

(58) Field of Classification Search
CPC .......... G06N 3/08; G06N 3/045; G06N 3/02; G06N 3/092; G06N 3/0475; G06N 3/042;
(Continued)

(56) References Cited

U.S. PATENT DOCUMENTS 10,453,197 B1 * 10/2019 Cholakkal ............ G06V 10/454
10,586,147 B2 * 3/2020 Wu ........................ G06N 3/088
(Continued)

FOREIGN PATENT DOCUMENTS

| CN | 112529806 A | 3/2021 |
| CN | 112784961 A | 5/2021 |
| CN | 113936173 A | 1/2022 |

OTHER PUBLICATIONS

Internation Search Report of PCT/CN2022/116045, Mailed Nov. 25, 2022.

*Primary Examiner* — Amir Alavi
(74) *Attorney, Agent, or Firm* — True Shepherd LLC; Andrew C. Cheng

(57) ABSTRACT

The present disclosure provides an image classification method for maximizing mutual information, device, medium and system, the method including: acquiring a training image; maximizing the mutual information between the training image and a neural network architecture, and automatically determining the network architecture and parameter of the neural network; and processing image data to be classified using the obtained neural network to obtain an image classification result. According to the present disclosure, the network architecture and parameter of the neutral network are automatically designed and determined by maximizing the mutual information based on given image data without burdensome manual design and saving human and computational resource consumption. The present disclosure can automatically design and obtain a neural (Continued)

network-based image classification method in a very short time, and at the same time can achieve higher image classification accuracy.

6 Claims, 3 Drawing Sheets

(51) Int. Cl.
*G06V 10/776* (2022.01)
*G06V 10/82* (2022.01)
*G06V 20/70* (2022.01)

(58) Field of Classification Search
CPC ...... G06N 3/082; G06N 3/049; G06N 3/0464; G06N 20/00; G06N 20/10; G06N 20/20; G06V 10/765; G06V 10/82; G06V 10/776; G06V 20/70; G06T 2207/20081; G06T 2207/20084; G06F 18/2414
See application file for complete search history.

(56) References Cited

U.S. PATENT DOCUMENTS

| | | | | |
|---|---|---|---|---|
| 10,600,184 | B2 * | 3/2020 | Golden | G06T 7/149 |
| 10,636,323 | B2 * | 4/2020 | Buras | A61B 8/466 |
| 10,706,355 | B2 * | 7/2020 | Cao | G06N 20/00 |
| 10,871,536 | B2 * | 12/2020 | Golden | G06N 3/084 |
| 11,080,587 | B2 * | 8/2021 | Gregor | G06N 3/044 |
| 11,182,620 | B2 * | 11/2021 | Weinzaepfel | G06N 3/045 |
| 11,301,750 | B2 * | 4/2022 | Markram | G06N 3/049 |
| 11,836,595 | B1 * | 12/2023 | Yang | G06N 3/082 |
| 11,907,853 | B2 * | 2/2024 | Fernando | G06N 3/086 |
| 2020/0151807 | A1 * | 5/2020 | Zhou | G06N 3/045 |
| 2021/0209775 | A1 | 7/2021 | Song | |
| 2021/0287099 | A1 | 9/2021 | Mroueh et al. | |
| 2023/0028992 | A1 | 1/2023 | Zagaynov et al. | |

* cited by examiner (a) Normal cell (b) Reduction cell

IMAGE CLASSIFICATION METHOD FOR MAXIMIZING MUTUAL INFORMATION, DEVICE, MEDIUM AND SYSTEM

CROSS-REFERENCE TO RELATED APPLICATIONS

This application is a continuation of International Patent Application No. PCT/CN2022/116045 with a filing date of Aug. 31, 2022, designating the United States, now pending, and further claims priority to Chinese Patent Application No. 202111170350.9 with a filing date of Oct. 8, 2021. The content of the aforementioned applications, including any intervening amendments thereto, are incorporated herein by reference.

TECHNICAL FIELD

The present disclosure relates to the technical field of artificial intelligence and image processing, and in particular to an image classification method for maximizing mutual information, a computer device thereof, and a readable storage medium.

BACKGROUND ART

With the development of large data and the improvement of computing ability, artificial intelligence technology has made rapid development in recent years, and the application demand of image classification and other image processing in industry is increasing. Early image processing is limited by an acquisition device, and the image quality is not high. A technology mainly used is manual feature extraction. Some manually designed feature extraction operators such as histogram of oriented gradient (HoG) and signal processing methods such as wavelet analysis promote the early development of image processing. However, the manually designed feature extraction operator is designed based on the prior knowledge and analysis of a given image by scientists, which inevitably retains the prejudice caused by human prior, and its performance in the task of image classification cannot exceed that of human. In addition, neural network combines feature the extractor and the classifier for end-to-end training, large data-driven approach makes the network automatically learn the most suitable feature extraction filter bank for image classification. The appearance of neural networks eliminates the manual design of feature extraction operators, and achieves a performance exceeding that is achieved by human experts in image classification tasks. Although the appearance of neural network makes people not need to manually design feature extraction operators, saves human resource consumption and improves the performance of image classification, the architecture of the neural network still relies on manual design.

Over the past decade, manually designed neural networks have achieved good performance in image processing tasks such as image classification, but the increasingly complex neural networks and the need for multiple image classification make the design of neural networks a complicated and inefficient work with large human and computational resource consumption. The image classification method for maximizing mutual information enables a machine to design the neural network for specific image classification autonomously, and at the same time, can automatically design and obtain the neural network model with better performance in a very short time, and provides a more efficient and convenient solution for building a neural network for image classification tasks in industrial applications, such as efficiently applying to different kinds of image data (e.g., natural images, medical images, etc.), and efficiently configuring devices on different computing resources (e.g., central servers, edge devices, etc.). With the development of large data and the improvement of computing ability, neural network-based image classification methods have been concerned and developed in recent years. For example, the image classification accuracy of Googlenet, Resnet, Densenet and other neural network architectures on the natural image data set ImageNet has exceeded that of human, but the tedious human resource consumption, lengthy network design time and specific data set-oriented make the neural network-based image classification methods less practical. Therefore, there is a need for a new image classification method based on neural network, which can greatly reduce the time of neural network design and ensure high performance, so that the image classification method can be efficiently deployed in practical industrial applications.

In addition, the existing image classification methods based on neural networks have the following disadvantages: (1) according to the specific image data, experts manually design the image classification method based on neural network, the design process is complex and needs a lot of human resources and computing resources; (2) the hand-designed image classification method based on neural network is not the best neural network due to the limitations of expert knowledge, and there is still a great improvement needed for the performance of the image classification. (3) At present, the existing automatically designed neural network for the image classification methods have high computational cost, need a lot of time, and there is still an improvement needed for the performance.

SUMMARY OF THE INVENTION

Regarding the deficiencies of the prior art, the present disclosure provides an image classification method for maximizing mutual information. The method can automatically determine the network architecture and parameter of the neural network according to given image data for image classification, thereby greatly reducing design time and human resource consumption while achieving higher image classification accuracy.

According to an aspect of the present disclosure, an image classification method for maximizing mutual information is provided, which includes:
acquiring a training image;
maximizing the mutual information between the training image and a neural network architecture, and automatically determining the neural network architecture and parameter of the neural network;
processing image data to be classified using the obtained neural network to obtain an image classification result.

Preferably, dividing the acquired training image into two parts; the maximizing the mutual information between the training image and the neural network architecture, and automatically determining the neural network architecture and parameter of the neural network includes:
constructing a super-network and an architecture-generating network, respectively performing data processing thereon to obtain network parameter of the super-network and a parameter of the architecture-generating network, and constructing a target network;
inputting all the training images into the target network, generating a predicted image category label, and according to the predicted image category label and a real image category label, calculating a cross entropy loss of the image classification, and training the target network until convergence for image classification.

Preferably, the constructing a super-network and an architecture-generating network, respectively performing data processing thereon to obtain a network parameter of the super-network and a parameter of the architecture-generating network, and constructing a target network includes:

S1: constructing cells based on all possible image classification operations;
constructing a super-network with the cells, where the super-network is formed by stacking the cells containing all possible image classification operations;

S2: constructing an architecture-generating network based on a convolution neural network, sampling from a standard Gaussian distribution to obtain a sampling value as an input of the architecture-generating network, and obtaining an output of the architecture-generating network through forward propagation;
sampling the noise from the standard Gaussian distribution; and
summing an output of the architecture-generating network and the sampled noise as an architecture parameter of the super-network;

S3: inputting the first part of the training image into the super-network to generate a prediction category label;
calculating image classification cross entropy loss according to the prediction category label and the real category label; and
updating the network parameter of the super-network according to the image classification cross entropy loss with a gradient descent method;

S4: inputting the second part of the training image into the super-network, maximizing the mutual information of the image data and the architecture parameter of the super-network, and determining a lower bound of the mutual information, where
the lower bound of the mutual information is the cross entropy loss of the posterior distribution of the architecture parameter and the posterior distribution of the image data, the cross entropy loss is calculated, and the parameters of the architecture-generating network are updated with the gradient descent method; and
repeating S2-S4 to iteratively update the network parameter of the super-network and the parameters of the architecture-generating network continuously until convergence, and stacking the updated new cells to construct a target network.

Preferably, the architecture-generating network refers to a neural network $\varnothing$ formed by stacking a convolution neural network, a modified linear unit and a batch normalization layer; an input of the architecture-generating network is a sampling value $\in\sim N(0,1)$ obtained from the standard Gaussian distribution;
an output of the architecture-generating network is performed by inputting the sampling value $\in$ into the architecture-generating network $\varnothing$, and performing forward propagation to obtain $\varnothing(\in)$ as an output; and
the architecture parameter of the super-network is $A=\varnothing(\in)+\varepsilon$ obtained by sampling noise $\varepsilon\sim N(0,1)$ from the standard Gaussian distribution and summing with the output of the architecture-generating network. That is, the architecture parameter of the super-network is formed by adding two parts: one part is generated by the architecture-generating network according to the sampling in the standard Gaussian distribution with a mean value being 0 and a variance being 1; the other part is noise sampled from a standard Gaussian distribution.

Preferably, the mutual information of the image data and the architecture parameter of the super-network refers to $I_\varnothing(D,A)$, where D represents the given training image data, A represents the architecture parameter of the super-network, and $\varnothing$ represents the network parameter describing the data set D given the architecture parameter A.

Preferably, a lower bound of the mutual information refers to $I_\varnothing(D,A) \geq H(D)+E_{p_\varnothing(D,A)}[\log q_\theta(D|A)]$, where H(D) represents an information entropy of the training image data D, $p_\varnothing(D,A)$ represents joint probability distribution of the training data and the architecture parameter of the super-network, and $q_\theta(D|A)$ represents variational distribution used to approximate the real data posterior distribution $p_\varnothing(D|A)$.

Preferably, the cross entropy loss of the posterior distribution of the architecture parameter and the posterior distribution of the image data refers to $E_{p_\varnothing(A|D)}[\log q_\theta(D|A)]$, where $p_\varnothing(A|D)$ represents a conditional probability distribution of the architecture parameter of the super-network given the training image data D and $q_\theta(D|A)$ represents variational conditional probability distribution of the training image data given the architecture parameter of the super-network.

Preferably, the stacking the updated new cells to construct a target network includes obtaining a sampling value from a standard Gaussian distribution, inputting an architecture-generating network to obtain an architecture parameter of an output super-network, and according to the architecture parameter of the super-network, selecting an image classification operation with the maximum value of a specified number of corresponding parameters from the super-network constructed by the cells to finally obtain a target network.

According to a second aspect of the present disclosure, a computer device is provided, which includes a memory, a processor, and a computer program stored on the memory and executable on the processor, where the processor, when executing the program, implements the image classification method for maximizing mutual information.

According to a third aspect of the present disclosure, a computer-readable storage medium is provided, which has stored thereon a computer program, and the computer program implements the above-described image classification method for maximizing mutual information when executed by a processor.

According to a fourth aspect of the present disclosure, a chip system is provided, which includes a processor coupled to a memory storing program instructions, where the program instructions stored in the memory, when executed by the processor, implement the image classification method for maximizing mutual information.

Compared with the prior art, the present disclosure has at least one of the following advantageous effects:

according to the above-mentioned image classification method for maximizing mutual information of the present disclosure, the network architecture and parameter of the neutral network are automatically designed and determined by maximizing the mutual information based on given image data without burdensome manual design and saving human and computational resource consumption.

The above-mentioned image classification method for maximizing mutual information of the present disclosure can automatically design and obtain a neural network-based image classification method in a very short time, and at the same time can achieve a high image classification accuracy.

BRIEF DESCRIPTION OF THE DRAWINGS

Other features, objects and advantages of the present disclosure will become more apparent from reading the detailed description of non-limiting embodiments with reference to the following drawings.

DETAILED DESCRIPTION OF THE INVENTION

Figure 1:
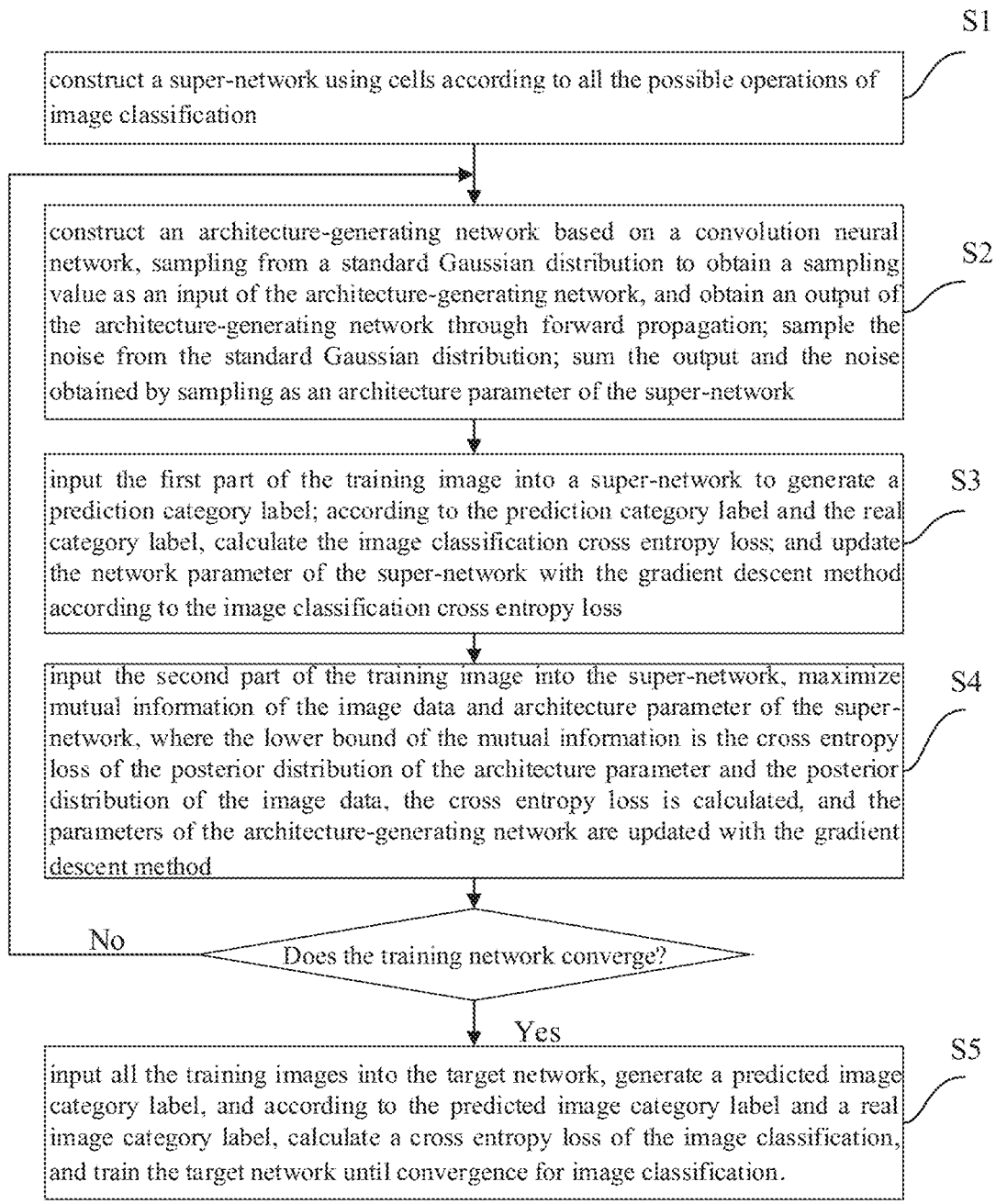
FIG. 1 is a flowchart of an image classification method for maximizing mutual information according to an embodiment of the present disclosure.

Hereinafter, the present disclosure will be described in detail with reference to specific examples. The following examples will aid a person skilled in the art in further understanding of the present disclosure, but do not limit the present disclosure in any way. It should be noted that several variations and modifications can be made by a person skilled in the art without departing from the inventive concept. These are all within the scope of the present disclosure.

The present disclosure provides an embodiment, an image classification method for maximizing mutual information including:

a training image is acquired;

the mutual information between the training image and a neural network architecture is maximized, and the neural network architecture and parameter of the neural network are automatically determined; and image data to be classified is processed using the obtained neural network to obtain an image classification result.

As a preferred embodiment, the mutual information between the training image and the neural network architecture is maximized, and the neural network architecture and parameter of the neural network are automatically determined, including:

a super-network and an architecture-generating network are constructed, data processing are respectively performed thereon to obtain network parameter of the super-network and a parameter of the architecture-generating network, and a target network is constructed; and all the training images are input into the target network, a predicted image category label is generated, and according to the predicted image category label and a real image category label, a cross entropy loss of the image classification is calculated, and the target network is trained until convergence for image classification.

As a preferred embodiment, the constructing a super-network and an architecture-generating network, respectively performing data processing thereon to obtain a network parameter of the super-network and a parameter of the architecture-generating network, and constructing a target network includes:

S1: construct a super-network using cells according to all the possible operations of image classification, where the super-network is formed by stacking the cells containing all possible image classification operations;

the super-network consists of a series of cells stacked according to a certain rule, each cell including a plurality of nodes, with all possible connections (edges) between the nodes and defining all possible image classification operations on the edges, including convolution, pooling, skip-connect, etc. Any two nodes that are connected represent that a node is used as an input to pass an output to the connected node through an operation on the connected edge. In a super-network, each cell contains a total of two input nodes, four intermediate nodes and one output node, and all the nodes are connected in pairs, forming a total of fourteen possible edges, except that the two input nodes are not connected and the output node is a cascade of four intermediate nodes, and each possible edge contains all eight possible operations. According to the method for maximizing mutual information, posterior distribution of the architecture parameter and the cross entropy loss of the posterior distribution of the image data are obtained according to the input image data, trained to iteratively update the parameters of the architecture-generating network, and finally the architecture of the cells (selection of possible operations) is determined from the super-network.

Figure 2:
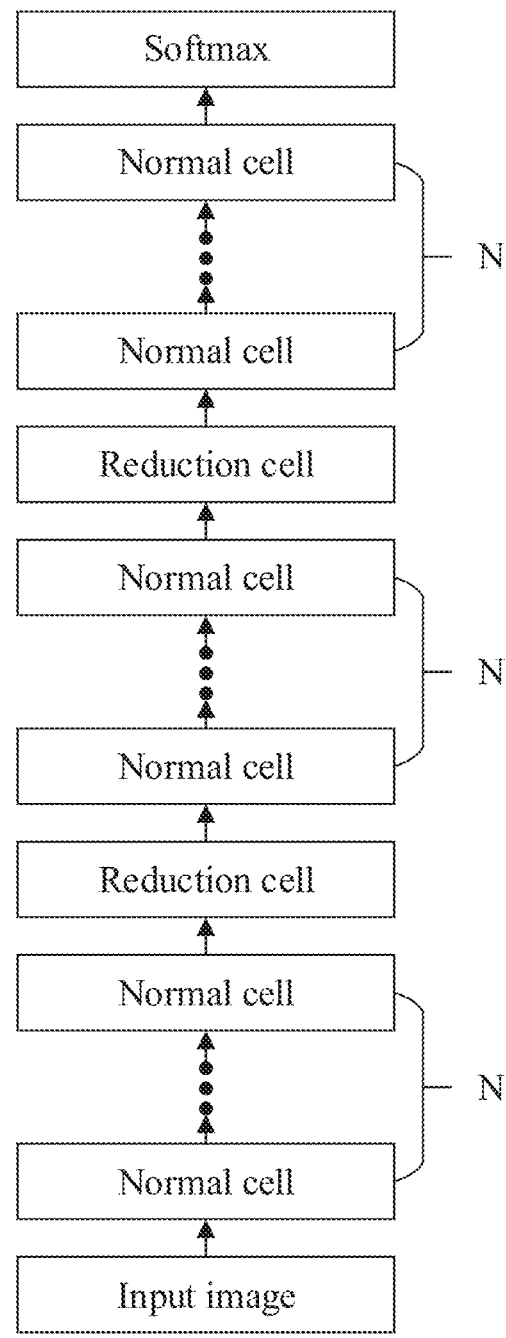
FIG. 2 is a schematic diagram illustrating a super-network with cells stacking according to an embodiment of the present disclosure.

As shown in FIG. 2, in one embodiment, the cells are stacked into a super-network as shown in FIG. 2, where the cells are divided into two types of Normal units and Reduction units. All possible operations in the Normal unit have a step size of 1, so that the output coincides with the input dimension after passing through the Normal unit, while operations in the Reduction unit adjacent to the input node have a step size of 2, so that the dimension of the input decreases by half after passing through this unit. This embodiment sets a reasonable overall architecture for a super-network, and after obtaining the cells through network architecture search, stacks same into an overall network architecture which can be used finally.

S2: construct an architecture-generating network based on a convolution neural network, sample from a standard Gaussian distribution to obtain a sampling value as an input of the architecture-generating network, and obtain an output of the architecture-generating network through forward propagation; sample the noise from the standard Gaussian distribution; sum the output of the architecture-generating network and the noise obtained by sampling as an architecture parameter of the super-network;

S3: input the first part of the training image into a super-network to generate a prediction category label; according to the prediction category label and the real category label, calculate the image classification cross entropy loss; and update the network parameter of the super-network with the gradient descent method according to the image classification cross entropy loss;

firstly, the image data is input to a convolution layer of the neural network, a modified linear unit, and a batch normalization layer to obtain a feature map; the convolution kernel slides on the input image to perform a convolution operation, and new image features are extracted through a convolution filter, where multiple convolution kernels (from multiple angles) can be used to extract the features of the image. Then the obtained feature map is input into a full connection layer, the extracted image is mapped to the corresponding image category label to obtain the prediction category label of the image, the image classification cross entropy loss is calculated according to the real category label of the image, and the network parameter of the super-network is updated by the gradient descent method.

The network parameter refers to parameters of all image classification operations in all cells, such as weighting parameters of convolution kernels, etc.

S4: input the second part of the training image into the super-network, maximize mutual information of the image data and architecture parameter of the super-network, and determine a lower bound of the mutual information, where the lower bound of the mutual information is the cross entropy loss of the posterior distribution of the architecture parameter and the posterior distribution of the image data, the cross entropy loss is calculated, and the parameters of the architecture-generating network are updated with the gradient descent method; and repeat S2-S4 to iteratively update the network parameter of the super-network and the parameters of the architecture-generating network continuously until convergence, and stack the updated new cells to construct a target network.

As a preferred embodiment, the architecture-generating network refers to a neural network $\varnothing$ formed by stacking a convolution neural network, a modified linear unit and a batch normalization layer. Sampling is performed from a standard Gaussian distribution N (0, 1) to obtain a sampling value $\in \sim N(0,1)$, as an input of the architecture-generating network, an output $\varnothing(\in)$ of the architecture-generating network is obtained by forward propagation, and then noise $\varepsilon \sim N(0,1)$ is sampled from the standard Gaussian distribution, and summed with the output of the architecture-generating network to obtain $A = \varnothing(\in) + \varepsilon$ to participate in training as an architecture parameter of the super-network.

As a preferred embodiment, the mutual information of the image data and the architecture parameter of the super-network refers to $I_\varnothing(D,A)$, where D represents the given training image data, A represents the architecture parameter of the super-network, and $\varnothing$ represents the network parameter describing the data set D given the architecture parameter A.

As a preferred embodiment, a lower bound of mutual information refers to $I_\varnothing(D,A) \geq H(D) + E_{p_\varnothing(D,A)}[\log q_\theta(D|A)]$, where H(D) represents an information entropy of the training image data D, $p_\varnothing(D,A)$ represents joint probability distribution of the training data and the architecture parameter of the super-network, and $q_\theta(D|A)$ represents variational distribution used to approximate the real data posterior distribution $p_\varnothing(D|A)$.

As a preferred embodiment, the cross entropy loss of the posterior distribution of the architecture parameter and the posterior distribution of the image data refers to $E_{p_\theta(A|D)}[\log q_\theta(D|A)]$, where $p_\varnothing(A|D)$ represents a conditional probability distribution of the architecture parameter of the super-network given the data D and $q_\theta(D|A)$ refers to variational conditional probability distribution of the training image data given the architecture parameter of the super-network.

As a preferred embodiment, the stacking the updated new cells to construct a target network includes obtaining a sampling value from a standard Gaussian distribution, inputting an architecture-generating network to obtain an architecture parameter of an output super-network, and according to the architecture parameter of the super-network, selecting an image classification operation with the maximum value of a specified number of corresponding parameters from the super-network constructed by the cells to finally obtain a target network.

Based on the same idea of the present disclosure, a computer device is provided, which includes a memory, a processor, and a computer program stored on the memory and executable on the processor, where the processor, when executing the program, implements the image classification method for maximizing mutual information.

Based on the same idea of the present disclosure, a computer-readable storage medium is provided, and the computer-readable storage medium has stored thereon a computer program which when executed by a processor, implements the above-mentioned image classification method for maximizing mutual information.

Based on the same idea of the present disclosure, a chip system is provided, which includes a processor coupled to a memory storing program instructions, where the program instructions stored in the memory, when executed by the processor, implement the image classification method for maximizing mutual information.

The present disclosure further provides a flow diagram of another preferred embodiment with reference to FIG. 1. The image classification method for maximizing mutual information includes:

S1: construct a super-network using cells according to all the possible operations of image classification, where the super-network is formed by stacking the cells containing all possible image classification operations;

S2: construct an architecture-generating network based on a convolution neural network, sampling from a standard Gaussian distribution to obtain a sampling value as an input of the architecture-generating network, and obtain an output of the architecture-generating network through forward propagation; sample the noise from the standard Gaussian distribution; sum the output and the noise obtained by sampling as an architecture parameter of the super-network;

S3: input the first part of the training image into a super-network to generate a prediction category label; according to the prediction category label and the real category label, calculate the image classification cross entropy loss; and update the network parameter of the super-network with the gradient descent method according to the image classification cross entropy loss;

S4: input the second part of the training image into the super-network, maximize mutual information of the image data and architecture parameter of the super-network, where the lower bound of the mutual information is the cross entropy loss of the posterior distribution of the architecture parameter and the posterior distribution of the image data, the cross entropy loss is calculated, and the parameters of the architecture-generating network are updated with the gradient descent method;

In this step, the mutual information of the image data and the architecture parameter of the super-network refers to $I_\varnothing(D,A)$, where D represents the given training image data, A represents the architecture parameter of the super-network, and $\varnothing$ represents the network parameter accurately describing the data set D given the architecture parameter A. The formula is equivalently substituted to obtain $$I_\varnothing(D, A) = H(D) + E_{p_\varnothing(D,A)}[\log q_\theta(D|A)] + D_{KL}(p_\varnothing(D, A) \| q_\theta(D|A)),$$

where H(D) represents an information entropy of the training image data D, $p_\varnothing(D,A)$ represents joint probability distribution of the training data and the architecture parameter of the super-network, and $q_\theta(D|A)$ represents variational distribution used to approximate the real data posterior distribution $p_\varnothing(D|A)$; and since a KL divergence constant is greater than or equal to 0, i.e., $D_{KL}(p_\varnothing(D,A)\|q_\theta(D|A))\geq 0$ is always set up, and a lower bound of mutual information is obtained as follows:

$$I_\phi(D, A) \geq H(D) + E_{p_\phi(D,A)}[\log q_\theta(D|A)].$$

The cross entropy loss of the posterior distribution of the architecture parameter and the posterior distribution of the image data refer to that for a given training image data, the information entropy H(D) is a constant value independent of the model parameter, therefore, optimizing the lower bound of mutual information can be further equivalent to optimizing $$\min_{\theta,\phi} -E_{p_\phi(D,A)}[\log q_\theta(D|A)]$$

where the formula is the cross entropy loss of the posterior distribution of the architecture parameter and the posterior distribution of the image data.

The gradient descent method is utilized to optimize the cross entropy loss and update the parameter of the architecture-generating network.

The above-mentioned S2-S4 are repeated, and the network parameter and architecture parameter of the supernetwork is continuously iteratively updated until being trained until convergence to finally obtain a target network.

S5: input all the training images into the target network, generate a predicted image category label, and according to the predicted image category label and a real image category label, calculate a cross entropy loss of the image classification, and train the target network until convergence for image classification. In this embodiment, the target network is trained based on a criterion of reducing the cross entropy loss, and the target network with the minimum cross entropy loss is finally obtained.

Figure 3:
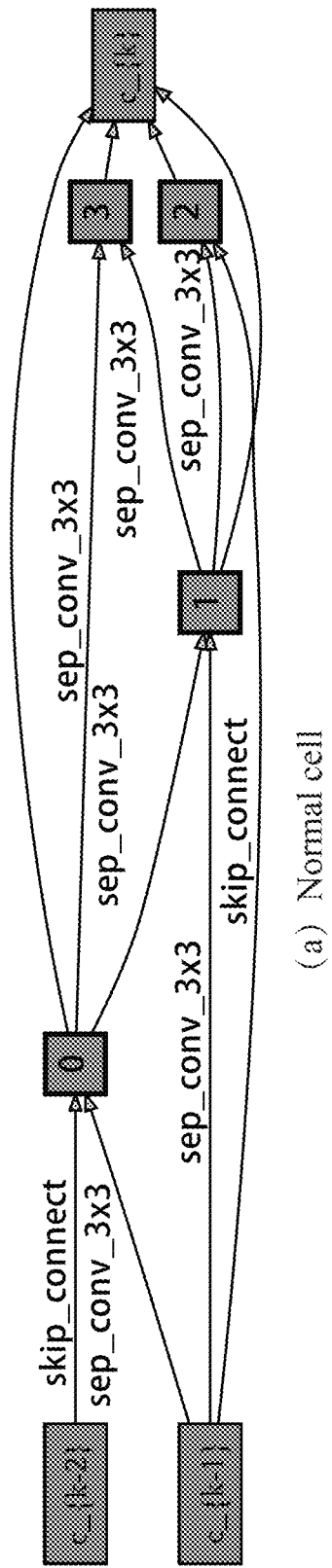
FIG. 3 is a schematic diagram illustrating a target structural unit resulting from iteratively updating network parameter of a super-network and parameters of an architecture-generating network through continuous training according to an embodiment of the present disclosure.
Figure 3:
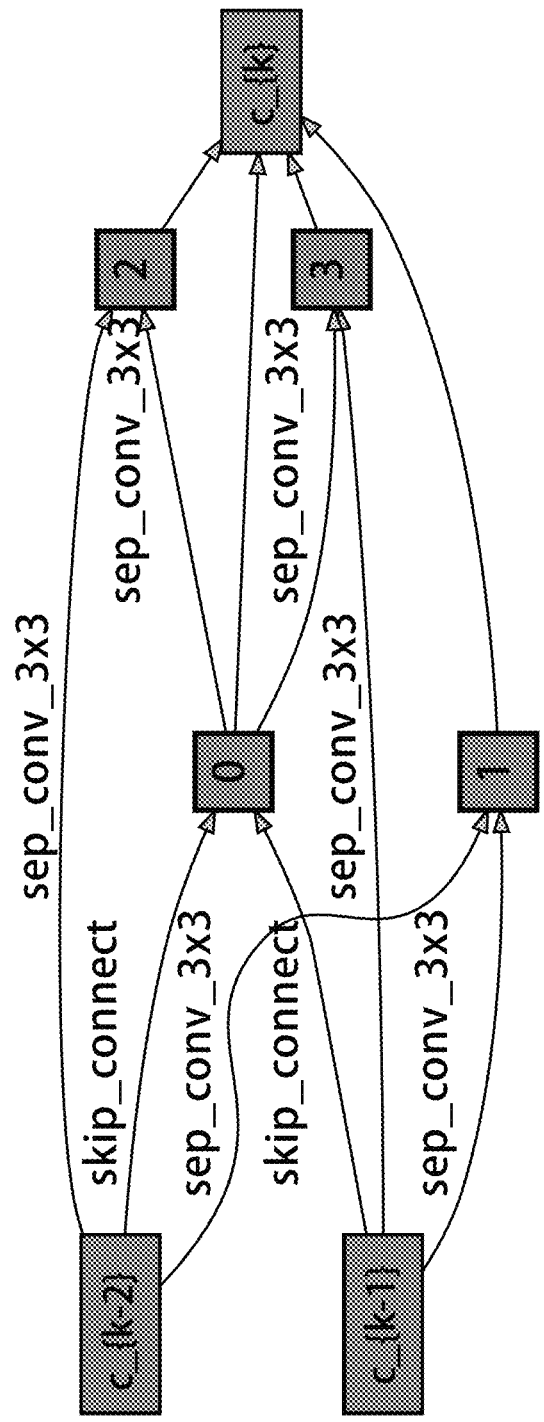

As shown in FIG. 3, the final target structural unit obtained by iteratively updating the network parameter and the architecture parameter through continuous training is: it is a Normal cell on the left and it is a Reduction cell on the right. The target structural unit is output to the image classification module as a result of maximizing mutual information. In order to illustrate the technical effect of the above-mentioned method, in an embodiment of the present disclosure, the target structural unit shown in FIG. 3 is a convergence architecture obtained by training for a epoch by the image classification method for maximizing mutual information, and the method can automatically design and obtain a target optimization network for image classification only by using a very short time of 0.007 GPU-days. Most neural networks searched for image classification require long training, and convergence is usually achieved in tens to hundreds of epochs depending on the convergence condition. The objective optimization network achieves an image classification test error (%) of 2.45±0.04 with 3.9 M parameters on CIFAR-10, and achieved an image classification test error rate of 15.80% and 24.0% when migrating to CIFAR-100 and ImageNet data sets, respectively. The automated design process for this image classification method can be run on a single Nvidia 1080Ti GPU for about 0.09 hours. Compared with DARTS (9.6 hours) and SNAS (36 hours), this result can significantly improve the design efficiency of neural network for image classification, and also achieve very high image classification accuracy, ensuring the practicality and stability of image classification method.

The specific comparison results can be seen in the following Tables 1, 2, 3 and 4: Table 1 is the comparison of the search results obtained by the example of the present disclosure (on the CIFAR-10 data set), Table 2 is the comparison of the search results obtained by the example of the present disclosure (on the ImageNet data set), Table 3 is the comparison of the search results obtained by the example of the present disclosure (on the NAS-Bench-201 benchmark), Table 4 is the comparison of the search results obtained by the example of the present disclosure (on the S1-S4 search space), the lower the error rate in the Table represents the better performance, the smaller the number of parameters and the amount of calculation represents the more efficient architecture.

TABLE 1

| Architecture | CIFAR-10 (%) | CIFAR-100 (%) | Params (M) | Cost (days) |
|---|---|---|---|---|
| DARTS-V1 | 3.00 ± 0.14 | 17.76 | 3.3 | 0.4 |
| DARTS-V2 | 2.76 ± 0.09 | 17.54 | 3.3 | 1.0 |
| P-DARTS | 2.50 | 16.55 | 3.4 | 0.3 |
| SNAS | 2.85 ± 0.02 | — | 2.8 | 1.5 |
| PARSEC | 2.81 ± 0.03 | — | 3.7 | 1 |
| BayesNAS | 2.81 ± 0.04 | — | 3.4 | 0.2 |
| DATA (M = 7) | 2.79 | — | 2.9 | 1 |
| PC-DARTS | 2.57 ± 0.07 | — | 3.6 | 0.1 |
| ASNG-NAS | 2.83 ± 0.14 | — | 3.9 | |
| SI-VDNAS-C | 2.60 ± 0.05 | 16.20 | 2.7 | 0.8 |
| GDAS | 2.93 | 18.38 | 3.4 | 0.21 |
| SDARTS-ADV | 2.61 ± 0.02 | — | 3.3 | 1.3 |
| SGAS | 2.66 ± 0.24 | — | 3.7 | 0.25 |
| DARTS– | 2.59 ± 0.08 | — | 3.5 | 0.4 |
| TE-NAS | 2.63 ± 0.06 | — | 3.8 | 0.05 |
| VIM-NAS | 2.45 ± 0.04 | 15.80 | 3.9 | 0.007 |

TABLE 2

| Architecture | Test Error (%) Top-1 | Test Error (%) Top-5 | FLOPS (M) | Search Cost (GPU-days) |
|---|---|---|---|---|
| DARTS (2nd) | 26.7 | 8.7 | 574 | 1 |
| GDAS | 26.0 | 8.5 | 581 | 0.21 |
| PARSEC | 26.0 | 8.4 | — | 1 |
| PC-DARTS | 25.1 | 7.8 | 586 | 0.1 |
| PC-DARTS* | 24.2 | 7.3 | 597 | 3.8 |
| P-DARTS | 24.4 | 7.4 | 557 | 0.3 |
| DARTS+* | 23.9 | 7.4 | 582 | 6.8 |
| DARTS–* | 23.8 | 7.0 | 467 | 4.5 |
| FairDARTS-B | 24.9 | 7.5 | 541 | 0.4 |
| DSO-NAS-share | 25.4 | 8.4 | 586 | 6 |
| SDARTS-ADV | 25.2 | 7.8 | — | 1.3 |
| SGAS | 24.2 | 7.2 | 585 | 0.25 |
| SparseNAS | 24.7 | 7.6 | — | 1 |
| BayesNAS | 26.5 | 8.9 | — | 0.2 |
| DATA (M = 7) | 24.9 | 8.1 | — | 1.5 |
| SI-VDNAS-B | 25.3 | 8.0 | 577 | 0.3 |
| TE-NAS | 26.2 | 8.3 | — | 0.05 |
| TE-NAS* | 24.5 | 7.5 | — | 0.17 |
| VIM-NAS | 24.0 | 7.2 | 627 | 0.007 |
| VIM-NAS* | 23.8 | 7.1 | 660 | 0.26 |

TABLE 3

| Method | | CIFAR-10 (%) | | CIFAR-100 (%) | | ImageNet-16-120 (%) | |
|---|---|---|---|---|---|---|---|
| | | validation | test | validation | test | validation | test |
| ResNet | N/A | 90.83 | 93.97 | 70.42 | 70.86 | 44.53 | 43.63 |
| Random | 0.01 | 90.93 ± 0.36 | 93.70 ± 0.36 | 70.60 ± 1.37 | 70.65 ± 1.38 | 42.92 ± 2.00 | 42.96 ± 2.15 |
| Reinforce | 0.12 | 91.09 ± 0.37 | 93.85 ± 0.37 | 70.05 ± 1.67 | 70.17 ± 1.61 | 43.04 ± 2.18 | 43.16 ± 2.28 |
| ENAS | 14058.80 | 39.77 ± 0.00 | 54.30 ± 0.00 | 10.23 ± 0.12 | 10.62 ± 0.27 | 16.43 ± 0.00 | 16.32 ± 0.00 |
| DARTS (1st) | 11625.77 | 39.77 ± 0.00 | 54.30 ± 0.00 | 38.57 ± 0.00 | 38.97 ± 0.00 | 18.87 ± 0.00 | 18.41 ± 0.00 |
| DARTS (2nd) | 35781.80 | 39.77 ± 0.00 | 54.30 ± 0.00 | 38.57 ± 0.00 | 38.97 ± 0.00 | 18.87 ± 0.00 | 18.41 ± 0.00 |
| GDAS | 31609.80 | 89.89 ± 0.08 | 93.61 ± 0.09 | 71.34 ± 0.04 | 70.70 ± 0.30 | 41.59 ± 1.33 | 41.71 ± 0.98 |
| SETN | 34139.53 | 84.04 ± 0.28 | 87.64 ± 0.00 | 58.86 ± 0.06 | 59.05 ± 0.24 | 33.06 ± 0.02 | 32.52 ± 0.21 |
| DARTS- | 11625.77 | 91.03 ± 0.44 | 93.80 ± 0.40 | 71.36 ± 1.51 | 71.53 ± 1.51 | 44.87 ± 1.46 | 45.12 ± 0.82 |
| TE-NAS | 1558 | — | 93.90 ± 0.47 | — | 71.24 ± 0.56 | — | 42.38 ± 0.46 |
| Ours | 232.51 | 91.48 ± 0.09 | 94.31 ± 0.11 | 73.12 ± 0.51 | 73.07 ± 0.58 | 45.92 ± 0.51 | 46.27 ± 0.17 |
| Ours (best) | 232.51 | 91.55 | 94.36 | 73.49 | 73.51 | 46.37 | 46.34 |
| Optimal | N/A | 91.61 | 94.37 | 73.49 | 73.51 | 46.77 | 47.31 |

TABLE 4

| Benchmark | | DARTS | R-DARTS [†] | | | | DARTS [†] | | PC-DARTS [‡] | SDARTS [‡] | | | |
|---|---|---|---|---|---|---|---|---|---|---|---|---|---|
| | | | DP | L2 | ES | ADA | DARTS- [†] | Ours [†] | | RS | ADV | DARTS- [‡] | Ours [‡] |
| C10 | S1 | 3.84 | 3.11 | 2.78 | 3.01 | 3.10 | 2.68 | 2.61 | 3.11 | 2.78 | 2.73 | 2.68 | 2.61 |
| | S2 | 4.85 | 3.48 | 3.31 | 3.26 | 3.35 | 3.71 | 3.22 | 3.02 | 2.75 | 2.65 | 2.63 | 2.53 |
| | S3 | 3.34 | 2.93 | 2.51 | 2.74 | 2.59 | 2.42 | 2.42 | 2.51 | 2.53 | 2.49 | 2.42 | 2.42 |
| | S4 | 7.20 | 3.58 | 3.56 | 3.71 | 4.84 | 3.88 | 3.55 | 3.02 | 2.93 | 2.87 | 2.86 | 2.85 |
| C100 | S1 | 29.46 | 25.93 | 24.25 | 28.37 | 24.03 | 22.41 | 22.07 | 18.87 | 17.02 | 16.88 | 16.92 | 16.12 |
| | S2 | 26.05 | 22.30 | 22.24 | 23.25 | 23.52 | 21.61 | 20.90 | 18.23 | 17.56 | 17.24 | 16.14 | 16.35 |
| | S3 | 28.90 | 22.36 | 23.99 | 23.73 | 23.37 | 21.13 | 21.11 | 18.05 | 17.73 | 17.12 | 15.86 | 15.94 |
| | S4 | 22.85 | 22.18 | 21.94 | 21.26 | 23.20 | 21.55 | 21.01 | 17.16 | 17.17 | 15.46 | 17.48 | 17.39 |

The above experiments show that the image classification method for maximizing mutual information provided by the embodiments of the present disclosure can improve the performance of the image classification method under the condition of limited computing resources, achieve higher accuracy, and can automatically design and adjust the image classification method based on neural network in a shorter time to have a wider application scenario.

Specific embodiments of the present disclosure have been described above. It is to be understood that the present disclosure is not limited to the specific embodiments described above, and that various changes and modifications within the scope of the claims may be made by a person skilled in the art without affecting the spirit of the present disclosure. The preferred features described above can be used in any combination without conflict.

What is claimed is:

1. An image classification method for maximizing mutual information, comprising:
   acquiring a training image;
   maximizing mutual information between the training image and a neural network architecture, and automatically determining the neural network architecture and parameters of the neural network;
   processing image data to be classified using the obtained neural network to obtain an image classification result; and
   dividing the acquired training image into two parts;
   wherein the maximizing the mutual information between the training image and the neural network architecture, and automatically determining the neural network architecture and parameters of the neural network, comprises:
   constructing a super-network and an architecture-generating network, respectively performing data processing thereon to obtain network parameters of the super-network and parameters of the architecture-generating network, and constructing a target network; and
   inputting all training images into the target network, generating a predicted image category label, and according to the predicted image category label and a real image category label, calculating a cross entropy loss of the image classification, and training the target network until convergence for image classification;
   wherein the constructing a super-network and an architecture-generating network, respectively performing data processing thereon to obtain a network parameter of the super-network and parameters of the architecture-generating network, and constructing a target network comprising:
   S1: constructing cells based on all possible image classification operations,
   constructing a super-network with the cells, wherein the super-network is formed by stacking the cells containing all possible image classification operations;
   S2: constructing an architecture-generating network based on a convolution neural network, sampling from a standard Gaussian distribution to obtain a sampling value as an input of the architecture-generating network, and obtaining an output of the architecture-generating network through forward propagation;
   sampling a noise from the standard Gaussian distribution; and
   summing an output of the architecture-generating network and the sampled noise as an architecture parameter of the super-network;

S3: inputting a first part of the training image into the super-network to generate a prediction category label; calculating image classification cross entropy loss according to the prediction category label and the real category label; and updating the network parameter of the super-network according to the image classification cross entropy loss with a gradient descent method;

S4: inputting a second part of the training image into the super-network, maximizing the mutual information of the image data and the architecture parameter of the super-network, and determining a lower bound of the mutual information, wherein the lower bound of the mutual information is the cross entropy loss of the posterior distribution of the architecture parameter and the posterior distribution of the image data, the cross entropy loss is calculated, and the parameters of the architecture-generating network are updated with the gradient descent method; and repeating S2-S4 to iteratively update the network parameter of the super-network and the parameters of the architecture-generating network continuously until convergence, and stacking the updated new cells to construct a target network.

2. The image classification method for maximizing mutual information according to claim 1, wherein the architecture-generating network refers to a neural network Ø formed by stacking a convolution neural network, a modified linear unit and a batch normalization layer; an input of the architecture-generating network is a sampling value $\in \sim N(0,1)$ obtained from the standard Gaussian distribution;

an output of the architecture-generating network is performed by inputting the sampling value $\in$ into the architecture-generating network Ø, and performing forward propagation to obtain Ø($\in$) as an output; and the architecture parameter of the super-network is A=Ø($\in$)+ε obtained by sampling noise $\varepsilon \sim N(0,1)$ from the standard Gaussian distribution and summing with the output of the architecture-generating network.

3. The image classification method for maximizing mutual information according to claim 1, wherein the mutual information of the image data and the architecture parameter of the super-network refers to $I_\varnothing(D,A)$, wherein D represents the given training image data, A represents the architecture parameter of the super-network, and Ø represents the network parameter describing the data set D given the architecture parameter A.

4. The image classification method for maximizing mutual information according to claim 1, wherein a lower bound of the mutual information refers to $I_\varnothing(D,A) \geq H(D) + E_{p_\varnothing}(D,A)[\log q_\theta(D|A)]$, wherein H(D) represents an information entropy of the training image data D, $p_\varnothing(D,A)$ represents joint probability distribution of the training data and the architecture parameter of the super-network, and $q_\theta(D|A)$ represents variational distribution used to approximate the real data posterior distribution $p_\varnothing(D|A)$.

5. The image classification method for maximizing mutual information according to claim 4, wherein the cross entropy loss of the posterior distribution of the architecture parameter and the posterior distribution of the image data refers to $E_{p_\varnothing}(A|D)[\log q_\theta(D|A)]$, wherein $p_\varnothing(A|D)$ represents a conditional probability distribution of the architecture parameter of the super-network given the training image data D and $q_\theta(D|A)$ represents variational conditional probability distribution of the training image data given the architecture parameter of the super-network.

6. The image classification method for maximizing mutual information according to claim 1, wherein the stacking the updated new cells to construct a target network comprises:

obtaining a sampling value from a standard Gaussian distribution, inputting an architecture-generating network to obtain an architecture parameter of an output super-network, and according to the architecture parameter of the super-network, selecting an image classification operation with the maximum value of a specified number of corresponding parameters from the super-network constructed by the cells to finally obtain a target network.

* * * * *